C. J. DEGAVRE & J. SESTA.
INDIVIDUAL NON-SKID CHAIN.
APPLICATION FILED FEB. 19, 1918.
1,286,552.
Patented Dec. 3, 1918.
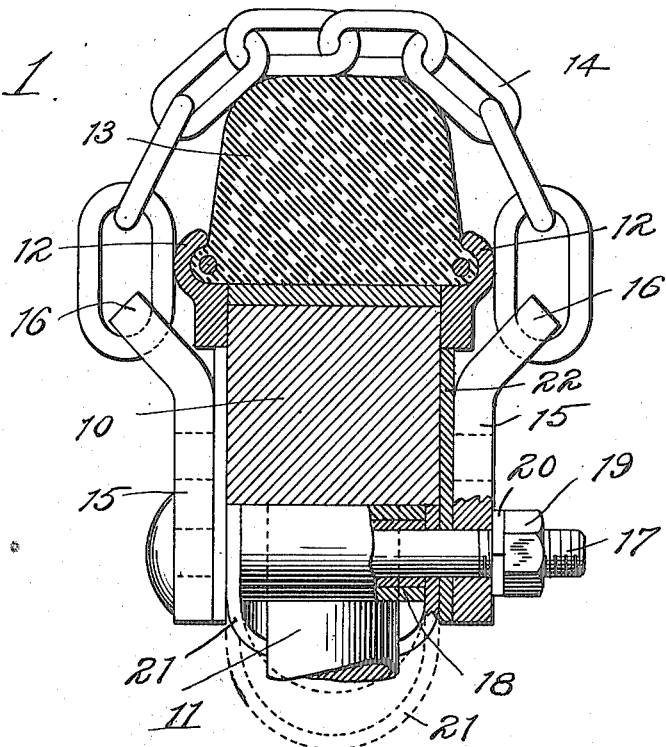
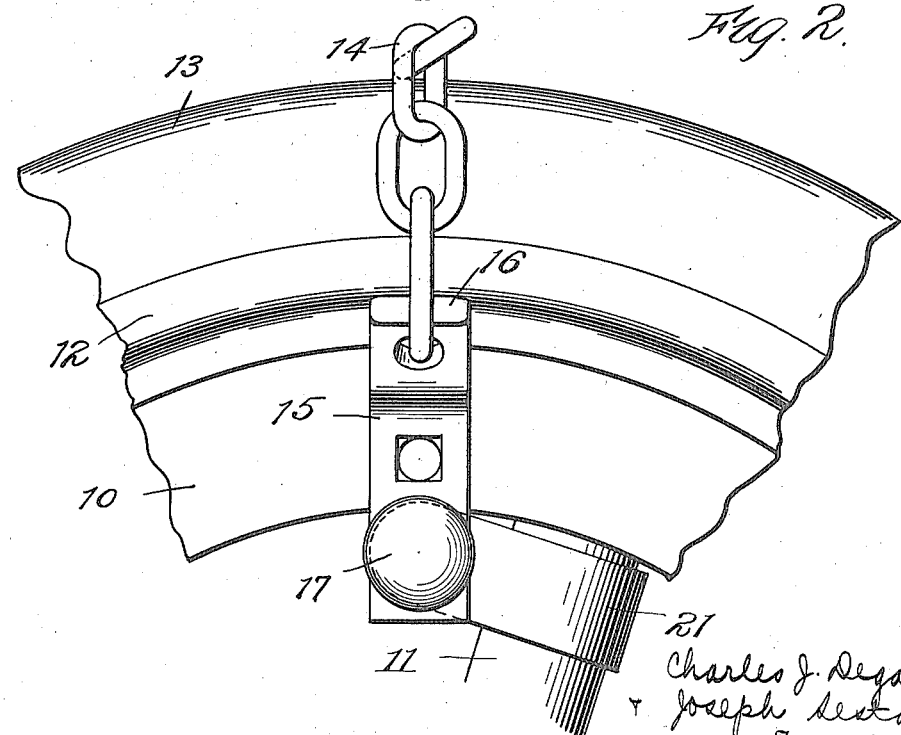
Charles J. Degavre
& Joseph Sesta
Inventors

UNITED STATES PATENT OFFICE.

CHARLES J. DEGAVRE AND JOSEPH SESTA, OF RED BANK, NEW JERSEY.

INDIVIDUAL NON-SKID CHAIN.

1,286,552.     Specification of Letters Patent.     Patented Dec. 3, 1918.

Application filed February 19, 1918. Serial No. 218,048.

*To all whom it may concern:*

Be it known that we, CHARLES J. DEGAVRE and JOSEPH SESTA, citizens of the United States, residing at Red Bank, in the county of Monmouth and State of New Jersey, have invented certain new and useful Improvements in Individual Non-Skid Chains, of which the following is a full and clear specification.

Our invention relates to individual non-skid chains for automobile and truck wheels.

Numerous forms of these devices have already been proposed and the particular improvement contemplated by the present invention resides in a construction by which the device is more readily applied to the wheel, is more secure when so applied, and is capable of ready adjustment to conform with various sizes of tires and shapes of wheel felly, etc.

According to our invention, the device comprises, in general, the chain passed around the outer tread surface of the tire and supported at its two ends by side bars held firmly against the sides of the felly by means of a connecting bolt or the like, which passes across the inner periphery of the felly.

The device is illustrated by way of example in the accompanying drawing, in which—

Figure 1 is a transverse section through a wheel felly and tire, on which the device is shown applied;

Fig. 2 is a side view of the same parts, showing the device secured to the wheel spoke.

Referring more specifically to said drawing, 10 indicates the wheel felly, 11 the spokes, 12 the wheel rim of any approved type and 13 the cushion tire. It will be understood that the particular type of vehicle or particular design of wheel on which the device is applied is subject to considerable variation and the one shown is to be understood as merely one example. The chain 14, which is to engage the road surface to prevent skidding, is held against the outer tread surface of the tire by means of the side bars 15, which, as clearly shown, are mainly in the form of straight, flat bars with their outer ends bent outward or offset at 16 and perforated to receive the end links of chain 14. These chain links are all preferably welded as the severe strain encountered is found to open any but substantially this form. Each side bar 15 is perforated in two or more places preferably, to receive a bolt 17, which is to be employed for securing the two side bars together at their inner ends, with their faces firmly against the sides of the wheel felly 10. The perforations in the side bar at one side of the device are, for example, square to conform with a square neck on the bolt 17, whereas the perforations in the other side bar may be circular in cross section. A spacing collar or sleeve 18 is positioned on the bolt 17, between the two side bars, this spacing collar being preferably formed with a more or less rigid or unyielding tube of, for example, metal, surrounded or covered by a more yielding material, such as rubber composition, friction tape, leather, or the like. The length of this collar 18 is approximately equal to the distance from one face of the felly to the other, so that the faces of the side bars 15 tend to remain parallel to the faces of the wheel felly when a nut 19 is tightened to cause the side bars to firmly grip the sides of the felly. The lock washer 20 may be advantageously employed between nut 19 and the outer face of one of the side bars 15.

In order to avoid loss of the entire device should some part break, we prefer to employ a loop member 21, which may be in the form of a leather strap, for passing around one of the wheel spokes. This leather strap 21 may, for example, be secured to the device by providing perforations in its ends and slipping them over the bolt 17, each end of the strap occupying a position between the end of the spacing collar 18 and the inner face of one of the side bars. Such parts as may come into contact with adjacent wheel portions may be padded or faced with non-abrasive material such as leather, rubber or the like, to avoid scratching the wheel felly or other parts of the wheel. We have shown, for example, leather facing strips 22 between the side bars 15 and the wheel felly 10 and a rubber tube 18$^a$ surrounding the spacing collar 18.

The outer ends 16 of the side bars are offset as already described, the purpose of this being to provide clearance over the wheel rim. The otherwise straight construction of the side bars permits considerable adjustment of them radially inward or outward to enable the device to conform with tires or wheel fellies of various dimensions, which would be sacrificed if the inner end of the side bar were caused to extend across the inner face of the wheel felly to any extent. By providing a plurality of perforations in the side bars, the bolts 17 may be fitted into that one which conforms most nearly to the requirements occasioned by the particular size of tire or wheel felly to which the device is to be applied.

Obviously those skilled in this art will be able to construct other designs of non-skid devices within the principles of the present invention and we do not wish to be understood as limiting the invention to the particular details or form of parts herein shown, except as indicated by the plain language of the claims.

We claim:

1. A non-skid chain device comprising in combination a pair of side bars having outer ends adapted to receive the chain, a chain mounted in said outer ends, a bolt for drawing the two sidebars toward each other against the sides of the felly, and a spacing collar extending across from one side bar to the other and adapted to limit the movement of said side bars toward each other in the act of applying the device to the wheel felly.

2. A non-skid chain device comprising in combination a chain, side bars having offset outer ends in which the ends of said chain are disposed, the remainder of said side bars being substantially straight, and means adapted to engage different portions of said side bars to draw them toward each other against the sides of the felly to secure the device in place.

CHARLES J. DEGAVRE.
JOSEPH SESTA.